July 14, 1959  W. E. LEWIS  2,894,370
REVERSIBLE ROTARY HYDRAULIC COUPLING
Filed Aug. 11, 1955  3 Sheets-Sheet 1

Warren E. Lewis
INVENTOR.

BY *Clarence A. O'Brien*
*and Harvey B. Jacobson*
Attorneys

July 14, 1959  W. E. LEWIS  2,894,370
REVERSIBLE ROTARY HYDRAULIC COUPLING
Filed Aug. 11, 1955  3 Sheets-Sheet 2

Warren E. Lewis
INVENTOR.

July 14, 1959  W. E. LEWIS  2,894,370
REVERSIBLE ROTARY HYDRAULIC COUPLING
Filed Aug. 11, 1955  3 Sheets-Sheet 3

Warren E. Lewis
INVENTOR.

United States Patent Office 2,894,370
Patented July 14, 1959

2,894,370

REVERSIBLE ROTARY HYDRAULIC COUPLING

Warren E. Lewis, Kankakee, Ill.

Application August 11, 1955, Serial No. 527,771

6 Claims. (Cl. 60—54)

This invention relates in general to improvements in reversible rotary hydraulic couplings, and is an improvement on the fluid transmission set forth in my Patent No. 2,683,351 granted July 13, 1954.

The primary object of this invention is to provide an improved fluid transmission which includes a shiftable turbine member whereby the direction of rotation of the turbine member may be varied as desired in respect to a drive impeller of the transmission, the shifting of the turbine member controlling the flow of fluid through the fluid transmission and also controlling the effective power exerted on the turbine member.

Another object of this invention is to provide an improved fluid transmission of the type including an impeller, a reversing vane ring and a turbine member, the turbine member including first and second vane rings selectively alignable with the impeller and the reversing vane ring whereby the flow of fluid within the transmission may be varied to change both the direction of rotation of the turbine member and the effect of the fluid thereon.

Still another object of this invention is to provide an improved transmission of the reversible rotary hydraulic coupling type, the transmission including an impeller wherein certain of the vanes have flexible portions so as to permit a faster torque build-up on the turbine member of the coupling during the initial movement of the turbine member and at the same time, to improve the coupling at speeds where the turbine member rotates substantially at the same speed as the impeller.

A further object of this invention is to provide an improved mechanism for locking a casing of a reversible rotary hydraulic coupling against rotation, the locking means including a one-way cam mechanism which permits the casing to rotate in unison with the impeller and turbine member of the coupling, but prevents reversal rotation of the casing, the casing carrying a reversing vane ring of the coupling.

A still further object of this invention is to provide an improved fluid transmission, the transmission including an automotive flywheel connected to a turbine member thereof, the flywheel being provided with suitable blades for effecting cooling of the fluid transmission.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 8:
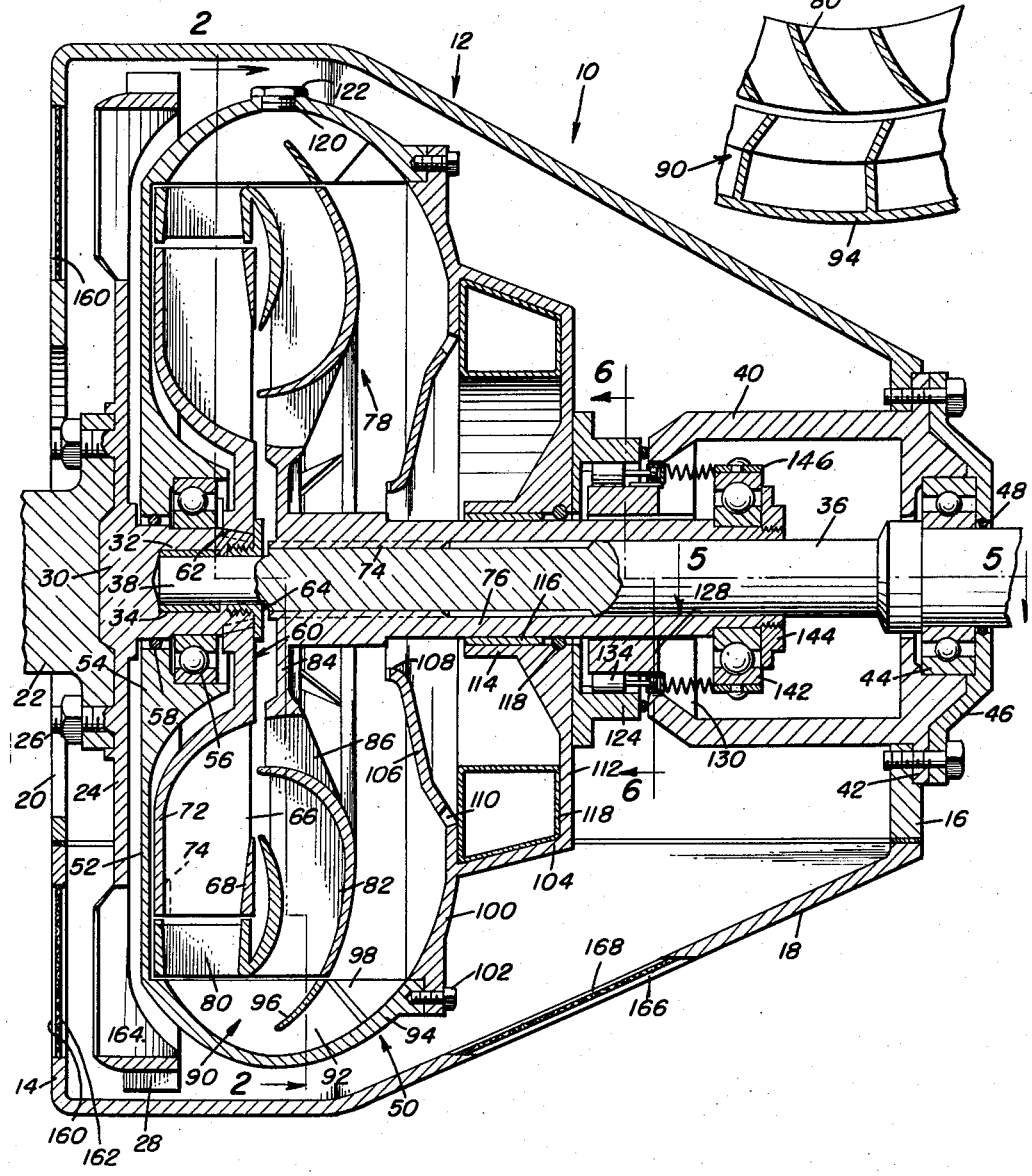
Figure 1 is a longitudinal vertical sectional view taken through the center of the fluid transmission, which is the subject of this invention, and shows the general construction thereof, the turbine member of the fluid transmission being in a position for forward drive.
Figure 2:
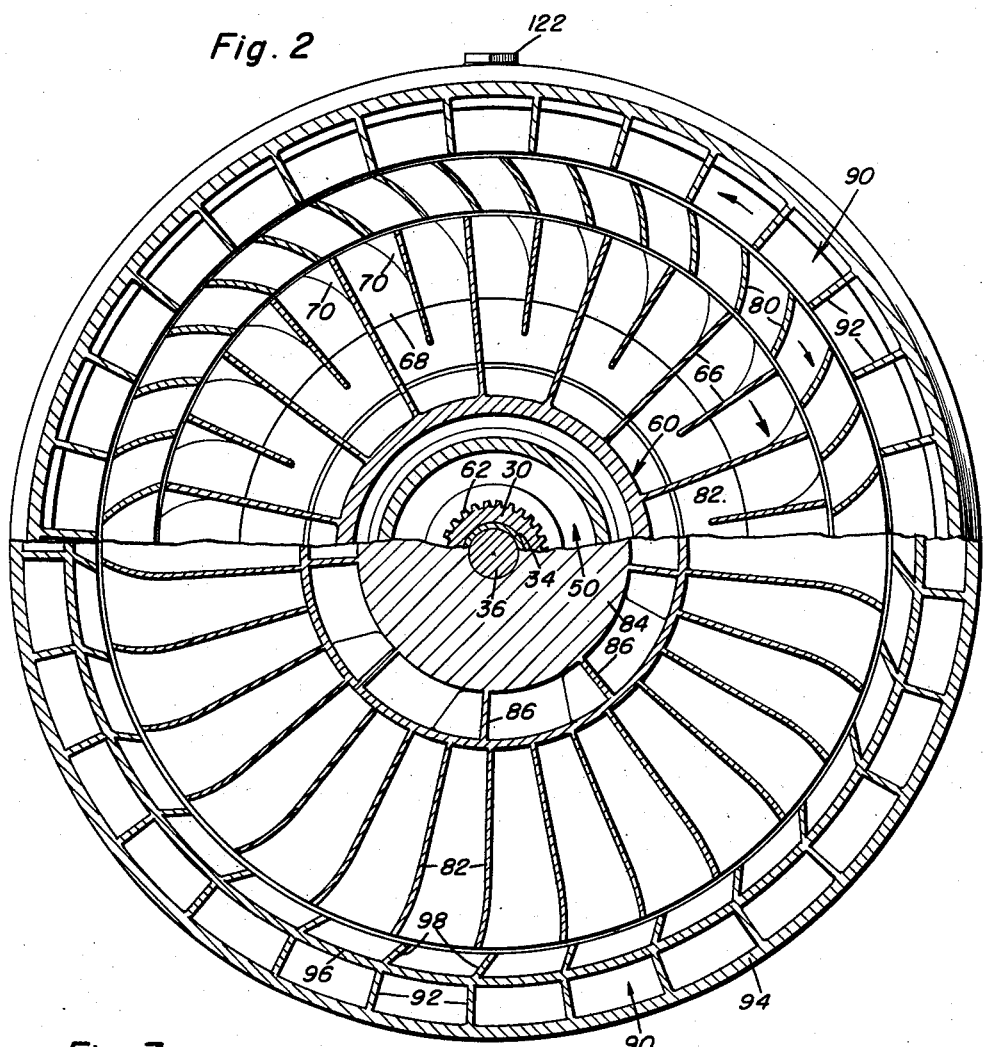
Figure 2 is a transverse vertical sectional view taken substantially upon a plane indicated by the section line 2—2 of Figure 1 and shows the arrangement and configuration of the various vanes of the impeller, the turbine member and the reversing vane ring.
Figure 7:
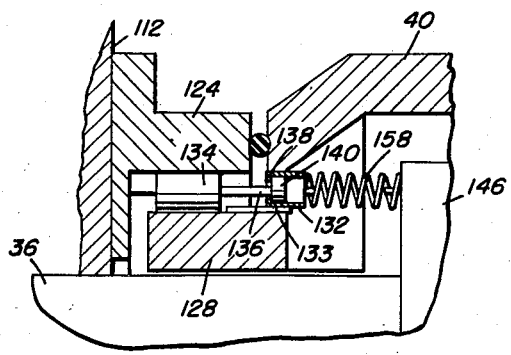
Figure 3:
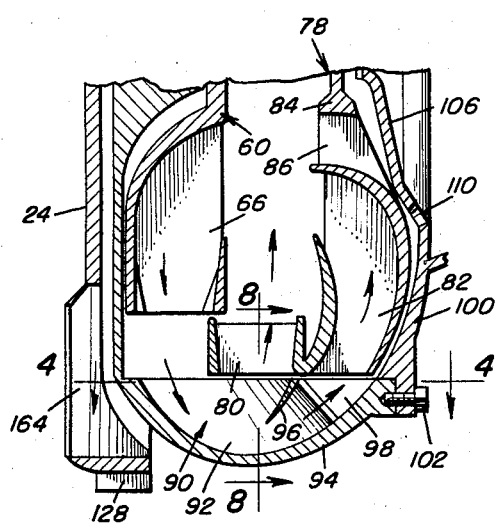
Figure 3 is a fragmentary vertical sectional view taken through the casing of the fluid transmission and shows the turbine member shifted rearwardly to a reverse drive position.

Figure 7 is an enlarged fragmentary vertical sectional view showing the specific details of the lock mechanism and the manner in which the individual rollers of the lock mechanism are carried by a ring; and Figure 8 is an enlarged fragmentary vertical sectional view taken substantially upon the plane indicated by section line 8—8 of Figure 3 and shows the general relationship of the vanes of the reversing vane ring with respect to the first vanes of the turbine member when the turbine member is in a reverse rotation position.

Referring now to the drawings in detail, it will be seen that there is illustrated the fluid transmission, which is the subject of this invention, the fluid transmission being referred to in general by the reference numeral 10. The fluid transmission 10 includes a housing which is referred to in general by the reference numeral 12. The housing 12 includes a front wall 14, a rear wall 16, and a body portion 18, the body portion 18 extending between and connecting together the front wall 14 and the rear wall 16.

The front wall 14 of the housing 12 is provided with an enlarged central opening 20 through which a crankshaft 22 may pass. Secured on the crankshaft 22 and disposed in the forward part of the housing is a conventional flywheel 24. The flywheel 24 is bolted onto the crankshaft 22 by means of bolts 26, and the periphery thereof is in the form of a starter ring 28.

The flywheel 24 includes a rearwardly extending central hub 30. The hub 30 is provided with a bore 32 in which there is disposed a suitable bearing 34. Extending rearwardly from the hub 30 is a driven shaft 36. The driven shaft 36 includes a reduced forward end portion 38 which is suitably journaled in the bearing 34.

Secured to the rear wall 16 of the housing 12 and projecting inwardly through the same is a generally tubular support 40. The support 40 includes a mounting flange 42 which abuts against the rear surface of the rear wall 16. The rear part of the support 40 has disposed therein a bearing 44 in which the rear portion of the driven shaft 36 is journaled. A plate 46 retains the bearing 44 in place and is provided with a suitable grease seal 48 engaging the shaft 36.

Disposed within the housing 12 is a casing which is referred to in general by the reference numeral 50. The casing 50 includes a front wall 52 which has an enlarged central portion 54. Disposed in the central portion 54 is a bearing 56 which is suitably journaled on the hub 30. The central portion 54 is sealed with respect to the hub 30 by means of an O-ring 58.

Mounted in the forward portion of the casing 50 is an impeller which is referred to in general by the reference numeral 60. The impeller 60 is splined on the hub 30, as at 62, and retained thereon by a locking member 64. The impeller 60 also includes a plurality of radially extending blades 66 whose outer portions are connected together by a ring 68 secured to the rear edges thereof. The blades 66 have their extreme outer parts detached from the ring 68 and the main portion of the impeller 60. The blades 66 are formed of spring steel and have their outer ends seated in grooves 70 formed in the ring 68. The main plate portion 72 of the impeller 60 is provided with suitable stops 74 to limit the bending of the outer ends of the blades 66. The purpose of the flexibility of the blades 66 will be set forth in more detail hereinafter.

Connected to the driven shaft 36 by means of a spline connection 74 is a sleeve 76. The sleeve 76 has carried thereby a turbine member which is referred to in general by the reference numeral 78. The turbine member 78 includes a first vane ring 80 which is disposed forwardmost, and a second vane ring 82 which is spaced rearwardly longitudinally of the vane ring 80. The vane ring 82 is secured to a hub portion 84 of the sleeve 76 by means of radially extending webs 86. The vane ring 80 is carried by the vane ring 82.

Figure 4:
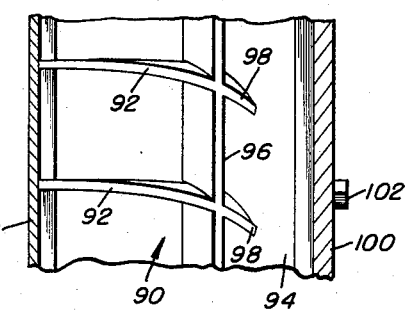
Figure 4 is an enlarged fragmentary sectional view taken substantially on the plane indicated by section line 4—4 of Figure 3 and shows the specific details of the vanes of the reversing vane ring.

The casing 50 also includes a reversing vane ring assembly which is referred to in general by the reference numeral 90. The vane ring assembly 90 includes a plurality of reversing vanes 92 which are secured to an intermediate portion 94 of the casing 50. The vanes 92 are connected intermediate their lengths by transverse webs 96. Further, the rear portions of the vanes 92 are curved, as at 98, to change the direction of flow of fluid passing thereover. The structure of reversing vane ring assembly 90 is best illustrated in Figure 4.

The casing 50 also includes a rear wall 100 which is secured to the intermediate portion 94 by suitable bolts 102. Carried by the rear wall 100 is a reservoir 104. The reservoir 104 includes a forwardly projecting portion 106 of the rear wall 100 as a wall thereof. The portion 106 is provided with suitable openings 108 and 110 communicating the reservoir 104 with the main portion of the casing 50.

The reservoir 104 includes a rear wall 112 and a hub portion 114. The hub portion 114 is journaled on the sleeve 76 for rotation by means of a bearing 116. The hub 114 is sealed with respect to the sleeve 76 by means of an O-ring 118.

Disposed within the reservoir 104 is an inflatable bag 118 under slight pressure. The bag 118 accommodates for any expansion and contraction of gases within the casing 50 and assures a maximum supply of hydraulic fluid being present for circulation by the impeller 60. The casing 50 is filled with hydraulic fluid through a filler opening 120 normally closed by a filler plug 122.

Figure 6:
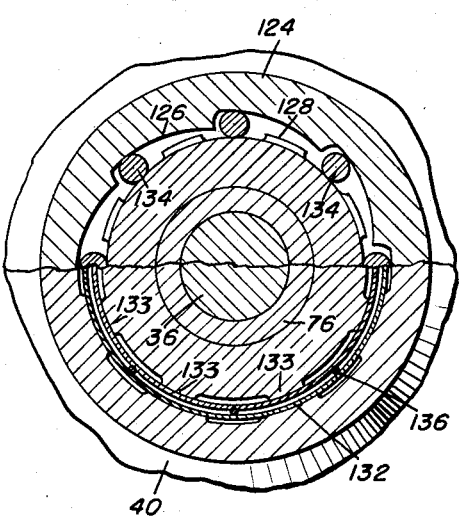
Figure 6 is an enlarged transverse vertical sectional view taken substantially upon the plane indicated by the section line 6—6 of Figure 1 and shows the specific details of the lock means for preventing reverse rotation of the casing.

Suitably secured to the rear wall 112 of the reservoir 104 is a cam ring 124. The cam ring 124, as is best illustrated in Figure 6, is provided with a plurality of circumferentially spaced, tapered cam surfaces 126.

Disposed concentric with the cam ring 124 is a fixed ring portion of the support 40, the ring portion being referred to by reference numeral 128. The ring portion 128 is connected to the main part of the support 40 by suitable ribs 130 which are circumferentially spaced.

Suitably seated in the support 40 forwardly of the ribs 130 is a channel-shaped cross-sectional ring 132, which is best illustrated in Figure 7. Disposed between the cam ring 124 and the ring 128 and normally bearing on the ring 128 is a plurality of circumferentially spaced rollers 134. The rollers 134 have rearwardly extending shank portions 136 which pass through suitable circumferentially spaced openings 138 in the retainer ring 132. The shank portions 136 terminate in enlarged rear portions 140 which are retained in the retainer ring 132.

Figure 5:
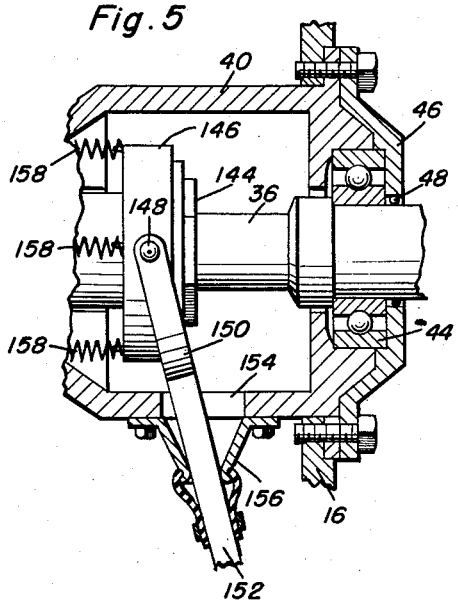
Figure 5 is a fragmentary horizontal sectional view taken substantially on the plane indicated by the section line 5—5 of Figure 1 and shows the specific details of the shifting mechanism for effecting longitudinal shifting of the turbine member.

In order that the turbine member 78 may be shifted longitudinally of the casing 50, there is secured to the rear part of the sleeve 76 a throw-out bearing 142. The throw-out bearing 142 is retained in place by a collar 144 and is mounted in a sleeve 146. The sleeve 146 has pivotally connected thereto by pins 148 a yoke 150 of a control arm 152. The control arm 152 passes through an opening 154 in the support 40 and is journaled in a mounting assembly 156 carried by the support 40 and best illustrated in Figure 5.

Connected to the forward part of the sleeve 146 is a plurality of longitudinally extending, circumferentially spaced springs 158. The springs 158 have their forward ends connected to the retainer ring 132.

In the forward drive position of the turbine member 78, the first vane ring 80 is aligned with the impeller 60, as is best illustrated in Figure 1. The oil being circulated within the casing 50 is driven radially by the blades 66 and passes through the first vane ring 80 to form the primary drive for the turbine members 78. The hydraulic fluid then passes through the first vane ring 80 into contact with the reversing vane ring assembly 90. The direction of the flow of the hydraulic fluid is reversed by the reversing vane ring assembly 90 and the flow of the hydraulic fluid from the reversing vane ring assembly is split into two paths by the webs 96. A majority of the hydraulic fluid passes through the second vane ring 82 to supplement the drive on the turbine member 78. This hydraulic fluid is moving in a generally toroidal path and is so directed against the vane ring 82 whereby it impinges against the rears of the blades thereof to urge movement of the vane ring 82 in the same direction as that of the vane ring 80. This hydraulic fluid is then directed back into the impeller 60 by the shape of the second vane ring 82. This is the normal coupling between the impeller 60 and the turbine member 78 under normal driving conditions. However, during acceleration, a majority of the hydraulic fluid will pass rearwardly of the second vane ring 82 and be redirected into the impeller 60 by the rear wall 100 of the casing 50. This will produce a torque multiplication. This occurs when the reversing vane ring assembly 90 is stopped and during rapid acceleration.

It is pointed out at this time that when the turbine member 78 is in its forwardmost drive position, there is a tendency for reverse rotation of the casing 50 due to the rear action on the reversing vane ring assembly 90. When the casing 50 tries to turn rearwardly, the cam ring 124 is urged in a counter-clockwise direction, as viewed in Figure 6, with the result that the rollers 134 ride up between the cam ring 124 and the ring 128 into wedging positions. This results in the locking of the casing 50 against rearward rotation. However, when the turbine member 78 locks up with the impeller 60 and the casing 50 attempts to turn with them as a unit, the casing 50 will be free to rotate in a clockwise direction, as is illustrated in Figure 6, the rollers 134 returning to their released position of Figure 6.

When reverse rotation of the driven shaft 36 is desired, the turbine member 78 is shifted rearwardly by shifting the sleeve 76 on the driven shaft 36. This results in the alignment of the vane rings in the manner best illustrated in Figure 3. The first vane ring 80 has now moved out of alignment with the impeller 60 and the hydraulic fluid circulated by the impeller 60 now passes directly into contact with the reversing vane ring assembly 90. This reverses the direction of flow of the hydraulic fluid so that it engages the vane ring 80 in a direction reverse from that when the turbine member 78 is in its drive position. This fluid so strikes the vane ring 80 whereby it impinges against the rears of the blades thereof and thus urges the vane ring 80 to rotate in a direction opposite to the direction of rotation of the impeller 60. It is this flow of hydraulic fluid that gives the maximum reverse torque. A certain amount of the hydraulic fluid passes under the webs 96 and is directed against the second vane ring 82. In view of the curvature of the rear portion of the vane 92, as at 98, the direction of flow of the hydraulic fluid is reversed and so strikes the vane ring 82 so as to also effect a reverse drive of the turbine member 78. This particular fluid flow is also in the maximum reverse speed.

When the sleeve 76 is shifted rearwardly to move the turbine member 78 in a reverse drive position, the springs 158 are tensioned and a retainer ring 132 is shifted to shift the rollers 134 into locking position. Thus, reverse rotation of the casing 50 is prevented, primarily due to the retaining of the rollers 134 against movement around the ring 128 by extension 133 of the ribs 132, as is best illustrated in Figures 6 and 7.

Referring once again to the details of the blade 66, it will be seen that the outer portions of the blades 66 are normally straight. However, during starting and acceleration, they spring back to permit a faster torque build up. After the initial torque build-up has been accomplished, the pressure on the outer ends of the blades 66 is diminished with the result that the other ends spring back to their normal straight positions so as to improve the coupling between the impeller 60 and the turbine members 78.

In order that the casing 50 and the hydraulic fluid disposed therein may be cooled, there is provided in the front wall 14 of the housing 12 spaced air openings 160. These openings 160 are closed by screens 162 to prevent the entrance of foreign matter. Air passes into the openings 160 and is moved rearwardly by means of blades 164 formed as a part of the flywheel 24. The air passes rearwardly through the housing 12 around the casing 50 and exits through an escape opening 166 in the lower part of the body portion 18. The opening 166 is also closed by a screen 168.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A rotary hydraulic coupling comprising axially fixed and aligned drive and driven shafts mounted for rotation relative to each other, an impeller carried by said drive shaft for rotation therewith, a turbine member carried by said driven shaft for rotation therewith, a casing surrounding said impeller and said turbine member, means mounting said turbine member for rotation about the axis of said drive and driven shafts, said casing including a reaction member, said impeller being disposed innermost relative to said axis and said reaction member being disposed outermost relative to said axis, said turbine member being disposed intermediate said impeller and said reaction member, said reaction member including fluid flow directing parts for radially reversing the flow of fluid circulated by said impeller and dividing said fluid into first and second streams, certain of said fluid flow directing parts further directing the flow of fluid of said second stream in circumferential direction reverse to that of said first stream, said turbine member including laterally adjacent first and second vane rings, means mounting said turbine member on said driven shaft for lateral movement relative to said impeller within said casing, shift means connected to said turbine member for longitudinally shifting the same between a forward drive position and a reverse drive position, said turbine member when in said forward drive position having said first vane ring radially aligned with said impeller and directly receiving fluid from said impeller and said second vane ring aligned with said first stream to supplement the action of said first vane ring and said second stream circulating about said turbine member, said turbine member when in said reverse drive position being disposed laterally of said impeller and having said first vane ring aligned with said first stream and said second vane ring aligned with said second stream to reverse the direction of drive of said turbine member, and means for controlling the rotation of said casing.

2. A rotary hydraulic coupling comprising axially fixed and aligned drive and driven shafts mounted for rotation relative to each other, an impeller carried by said drive shaft for rotation therewith, a turbine member carried by said driven shaft for rotation therewith, a casing surrounding said impeller and said turbine member, means mounting said turbine member for rotation about the axis of said drive and driven shafts, said casing including a reaction member, said impeller being disposed innermost relative to said axis and said reaction member being disposed outermost relative to said axis, said turbine member being disposed intermediate said impeller and said reaction member, said reaction member including fluid flow directing parts for radially reversing the flow of fluid circulated by said impeller and dividing said fluid into first and second streams, certain of said fluid flow directing parts further directing the flow of fluid of said second stream in circumferential direction reverse to that of said first stream, said turbine member including laterally adjacent first and second vane rings, said second vane ring extending inwardly of said first vane ring and being partially disposed in lateral overlapping relation relative to said impeller, means mounting said turbine member on said driven shaft for lateral movement relative to said impeller within said casing, shaft means connected to said turbine member for longitudinally shifting the same between a forward drive position and a reverse drive position, said turbine member when in said forward drive position having said first vane ring radially aligned with said impeller and directly receiving fluid from said impeller and said second vane ring aligned with said first stream to supplement the action of first vane ring and said second stream circulating about said turbine member, said turbine member when in said reverse drive position being disposed laterally of said impeller and having said first vane ring aligned with said first stream and said second vane ring aligned with said second stream to reverse the direction of drive of said turbine member, and means for controlling the rotation of said casing.

3. A rotary hydraulic coupling comprising axially fixed and aligned drive and driven shafts mounted for rotation relative to each other, an impeller carried by said drive shaft for rotation therewith, a turbine member carried by said driven shaft for rotation therewith, a casing surrounding said impeller and said turbine member, means mounting said turbine member for rotation about the axis of said drive and driven shafts, said casing including a reaction member, said impeller being disposed innermost relative to said axis and said reaction member being disposed outermost relative to said axis, said turbine member being disposed intermediate said impeller and said reaction member, said reaction member including fluid flow directing parts for radially reversing the flow of fluid circulated by said impeller and driving said fluid into first and second streams, certain of said fluid flow directing parts further directing the flow of fluid of said second stream in circumferential direction reverse to that of said first stream, said turbine member including laterally adjacent first and second vane rings, means mounting said turbine member on said driven shaft for lateral movement relative to said impeller within said casing, shift means connected to said turbine member for longitudinally shifting the same between a forward drive position and a reverse drive position, said turbine member when in said forward drive position having said first vane ring radially aligned with said impeller and directly receiving fluid from said impeller and said second vane ring aligned with said first stream to supplement the action of said first vane ring and said second stream circulating about said turbine member, said turbine member when in said reverse drive position being disposed laterally of said impeller and having said first vane ring aligned with said first stream and said second vane ring aligned with said second stream to reverse the direction of drive of said turbine member, and a housing, said casing being disposed in said housing, lock means carried by said housing for locking said casing and said reaction member against rotation.

4. A rotary hydraulic coupling comprising axially fixed and aligned drive and driven shafts mounted for rotation relative to each other, an impeller carried by said drive shaft for rotation therewith, a turbine member carried by said driven shaft for rotation therewith, a casing surrounding said impeller and said turbine member, means mounting said turbine member for rotation about the axis of said drive and driven shafts, said casing including a reaction member, said impeller being disposed innermost relative to said axis and said reaction member being disposed outermost relative to said axis, said turbine member being disposed intermediate said impeller and said reaction member, said reaction member including fluid flow directing parts for radially reversing the flow of fluid circulated by said impeller and dividing said fluid into first and second streams, certain of said fluid flow directing parts further directing the flow of fluid of said second stream in circumferential direction reverse to that of said first stream, said turbine member including laterally adjacent first and second vane rings, vanes of said first vane ring facing in an opposite direction from vanes of said second vane ring, means mounting said turbine member on said driven shaft for lateral movement relative to said impeller within said casing, shift means connected to said turbine member for longitudinally shifting the same between a forward drive position and a reverse drive position, said turbine member when in said forward drive position having said first vane ring radially aligned with said impeller and directly receiving fluid from said impeller and said second vane ring aligned with said first stream to supplement the action of first vane ring and said second stream circulating about said turbine member, said turbine member when in said reverse drive position being disposed laterally of said impeller and having said first vane ring aligned with said first stream and said second vane ring aligned with said second stream to reverse the direction of drive of said turbine member, and means for controlling the rotation of said casing.

5. A rotary hydraulic coupling comprising axially fixed and aligned drive and driven shafts mounted for rotation relative to each other, an impeller carried by said drive shaft for rotation therewith, a turbine member carried by said driven shaft for rotation therewith, a casing surrounding said impeller and said turbine member, means mounting said turbine member for rotation about the axis of said drive and driven shafts, said casing including a reaction member, said impeller being disposed innermost relative to said axis and said reaction member being disposed outermost relative to said axis, said turbine member being disposed intermediate said impeller and said reaction member, said reaction member including fluid flow directing parts for radially reversing the flow of fluid circulated by said impeller and dividing said fluid into first and second streams, certain of said fluid flow directing parts further directing the flow of fluid of said second stream in circumferential direction reverse to that of said first stream, said turbine member including laterally adjacent first and second vane rings, means mounting said turbine member on said driven shaft for lateral movement relative to said impeller within said casing, shift means connected to said turbine member for longitudinally shifting the same between a forward drive position and a reverse drive position, said turbine member when in said forward drive position having said first vane ring radially aligned with said impeller and directly receiving fluid from said impeller and said second vane ring aligned with said first stream to supplement the action of said first vane ring and said second stream circulating about said turbine member, said turbine member when in said reverse drive position being disposed laterally of said impeller and having said first vane ring aligned with said first stream and said second vane ring aligned with said second stream to reverse the direction of drive of said turbine member, lock means for controlling the rotation of said casing, and a housing, said casing being disposed in said housing, said lock means including a one-way cam connection between said casing and said housing whereby reverse rotation of said casing is prevented.

6. A rotary hydraulic coupling comprising axially fixed and aligned drive and driven shafts mounted for rotation relative to each other, an impeller carried by said drive shaft for rotation therewith, a turbine member carried by said driven shaft for rotation therewith, a casing surrounding said impeller and said turbine member, means mounting said turbine member for rotation about the axis of said drive and driven shafts, said casing including a reaction member, said impeller being disposed innermost relative to said axis and said reaction member being disposed outermost relative to said axis, said turbine member being disposed intermediate said impeller and said reaction member, said reaction member including fluid flow directing parts for radially reversing the flow of fluid circulated by said impeller and dividing said fluid into first and second streams, certain of said fluid flow directing parts further directing the flow of fluid of said second stream in circumferential direction reverse to that of said first stream, said turbine member including laterally adjacent first and second vane rings, means mounting said turbine member on said driven shaft for lateral movement relative to said impeller within said casing, shift means connected to said turbine member for longitudinally shifting the same between a forward drive position and a reverse drive position, said turbine member when in said forward drive position having said first vane ring radially aligned with said impeller and directly receiving fluid from said impeller and said second vane ring aligned with said first stream to supplement the action of said first vane ring and said second stream circulating about said turbine member, said turbine member when in said reverse drive position being disposed laterally of said impeller and having said first vane ring aligned with said first stream and said second vane ring aligned with said second stream to reverse the direction of drive of said turbine member, means for controlling the rotation of said casing, said casing including an integral reservoir, an inflated compressible bag positioned in said reservoir to compensate for fluid flow and gases in said casing.

References Cited in the file of this patent

UNITED STATES PATENTS

| | | |
|---|---|---|
| 1,203,265 | Radcliffe | Oct. 31, 1916 |
| 1,298,990 | Mason | Apr. 1, 1919 |
| 2,378,353 | Zeidler | June 12, 1945 |
| 2,387,415 | Sibert | Oct. 23, 1945 |
| 2,457,692 | La Brie | Dec. 28, 1948 |
| 2,683,351 | Lewis | July 13, 1954 |